United States Patent [19]

Chopin et al.

[11] Patent Number: 5,607,892
[45] Date of Patent: *Mar. 4, 1997

[54] ZIRCONIUM/CERIUM MIXED OXIDE CATALYST/CATALYST SUPPORT COMPOSITIONS HAVING HIGH/STABLE SPECIFIC SURFACES

[75] Inventors: Thierry Chopin, Saint Denis, France; Gabriel Vilmin, Princeton, N.J.

[73] Assignee: Rhone-Poulenc Chimie, Courbevoie Cedex, France

[*] Notice: The term of this patent shall not extend beyond the expiration date of Pat. No. 5,532,198.

[21] Appl. No.: 194,529

[22] Filed: Feb. 10, 1994

[30] Foreign Application Priority Data

Feb. 10, 1993 [FR] France .................................... 93 01450

[51] Int. Cl.⁶ .............................. B01J 21/06; B01J 23/10; C01F 17/00
[52] U.S. Cl. ........................ 502/304; 502/303; 502/349; 502/351; 502/353; 502/355; 502/439
[58] Field of Search .................................. 502/304, 349, 502/351, 353, 303, 355, 439

[56] References Cited

U.S. PATENT DOCUMENTS

| | | | |
|---|---|---|---|
| 4,731,234 | 3/1988 | Wada et al. | 502/202 |
| 4,820,667 | 4/1989 | Tsunekawa | 501/104 |
| 5,004,711 | 4/1991 | Grodek | 501/103 |
| 5,091,348 | 2/1992 | Woodhead et al. | 501/136 |
| 5,275,759 | 1/1994 | Osaka et al. | 501/103 |

FOREIGN PATENT DOCUMENTS

| | | |
|---|---|---|
| 0567328 | 9/1984 | Australia . |
| 0244301 | 11/1987 | European Pat. Off. . |
| 2590887 | 6/1987 | France . |
| 3737419 | 5/1988 | Germany . |
| 61083627 | 10/1984 | Japan . |
| 62-261803 | 5/1986 | Japan . |
| 63-242917 | 10/1988 | Japan . |

*Primary Examiner*—Asok Pal
*Assistant Examiner*—Bekir L. Yildirim
*Attorney, Agent, or Firm*—Burns, Doane, Swecker & Mathis, L.L.P.

[57] ABSTRACT

Zirconium/cerium mixed oxides (optionally including thermally stabilizing dopant values), comprising solid solutions thereof, having contents of zirconium of up to 99% by weight, and having high specific surface areas, are well suited as catalysts and/or catalyst supports, notably for the treatment/conversion of vehicular exhaust gases; such $ZrO_2/CeO_2$ mixed oxides are conveniently prepared by (i) intimately admixing a zirconium sol with a cerium sol, the ratio r of the mean diameter $r_1$ of the particles of the zirconium sol to the diameter $r_2$ of the particles of the cerium sol being at least 5, (ii) adding a precipitating amount of a base thereto, (iii) recovering the precipitate thus formed, and (iv) calcining the recovered precipitate.

49 Claims, No Drawings

5,607,892

ZIRCONIUM/CERIUM MIXED OXIDE CATALYST/CATALYST SUPPORT COMPOSITIONS HAVING HIGH/STABLE SPECIFIC SURFACES

CROSS-REFERENCE TO COMPANION APPLICATIONS

Copending applications Ser. No. 08/170,725, filed Dec. 21, 1993, and Ser. No. 08/194,416, filed concurrently herewith, both assigned to the assignee hereof.

BACKGROUND OF THE INVENTION

1. Field of the Invention

The present invention relates to compositions of matter based on mixed zirconium and cerium oxides having improved specific surface areas, in particular having high and thermally stable specific surfaces.

This invention also relates to a process for the preparation of such compositions, and to the use thereof, notably in the field of catalysis, whether as catalysts, per se, and/or as catalyst supports, e.g., for the conversion of vehicular exhaust gases.

2. Description of the Prior Art

Zirconium oxide and cerium oxide are well known compounds that are particularly useful and advantageous constituents, either alone or in combination, in a wide variety of catalyst compositions, e.g., multifunctional catalyst compositions, especially catalysts suited for the treatment or conversion of exhaust gases emanating from internal combustion engines. By "multifunctional" is intended a catalyst capable of effecting not only oxidation, in particular of carbon monoxide and of hydrocarbons present in exhaust gases, but also reduction, in particular of nitrogen oxides also present in these gases ("three-way" catalysts).

It will be appreciated that such catalysts, both at the level of their compositional nature, as well as principle of action, are widely described in the literature, both patent and otherwise.

Given that the scientific theories which to date have been advanced to explain this fact still appear somewhat uncertain, and at times even contradictory, it nevertheless now appears well established that the "three-way" industrial catalysts which contain both zirconium oxide and cerium oxide are overall more efficient than those catalysts which are either totally devoid of the aforesaid two oxides, or devoid of only one of them.

In catalysts such as those indicated above, the zirconium oxide and cerium oxide, which moreover can exert a specific catalytic function and/or a simple support function for other catalytic elements such as platinum, rhodium and other precious metals, are generally present in an uncombined form, namely, these two constituents are present in the final catalyst in the form of a simple physical admixture of highly distinctive oxide particles. This results in part from the fact that these catalysts based on zirconium oxide and cerium oxide are characteristically produced by intimate mixing of the corresponding oxide powders, or else of precursors which are thermally decomposable into said oxides.

However, for a variety of reasons, an increasingly marked tendency is developing in this art to introduce and to employ the elements zirconium and cerium in the composition of the catalyst, not in a separate and uncombined form, but, to the contrary, directly in the form of true mixed oxides $ZrO_2$/$CeO_2$ of essentially, and preferably even entirely, solid solution type.

Nonetheless, in such a case, and this is conventional in the field of catalysis, mixed oxides are required having a specific surface area which is the highest possible and also, preferably, thermally stable. Indeed, taking account of the fact that the efficiency of a catalyst is generally all the greater when the surface area of contact between the catalyst (catalytically active phase) and the reactants is high, it is expedient that the catalysts, both while fresh and after prolonged use at more or less elevated temperatures, be maintained in a state which is the most finely divided possible, i.e., the solid particles, or crystallites, comprising same should remain as small and as individualized as possible. This cannot be attained except by starting from mixed oxides having high specific surface areas and which are relatively stable to temperature.

SUMMARY OF THE INVENTION

Accordingly, a major object of the present invention is the provision, via simple, economical and reproducible technique, of a wide range of compositions based on mixed oxides of essentially or completely solid solution type in the $ZrO_2$/$CeO_2$ system (by "wide range of compositions" is intended that the proportions of zirconium and cerium in the solid solutions can vary over very wide limits, as indicated below), said compositions having, on the one hand, large specific surface areas, even in the event of high cerium contents, and, on the other, preserving significant specific surface even after calcinations at high temperatures.

Briefly, the present invention features a novel synthesis for the preparation of compositions based on mixed zirconium and cerium oxides, comprising:

(i) first admixing a zirconium sol with a cerium sol, in the required stoichiometric proportions, the ratio r of the mean diameter $r_1$ of the particles constituting said zirconium sol to the mean diameter $r_2$ of the particles constituting the said cerium sol being at least 5 ($r=r_1/r_2$), (ii) next adding a base to the mixture thus obtained, (iii) recovering the precipitate thus formed, and (iv) finally, calcining the precipitate thus recovered, whereby a final composition based on mixed zirconium and cerium oxides having improved specific surface area characteristics is produced.

DETAILED DESCRIPTION OF BEST MODE AND PREFERRED EMBODIMENTS OF THE INVENTION

More particularly according to the present invention, phases of mixed oxide type are provided at calcination temperatures as low as approximately 700° C. This process thus permits the use of reaction temperatures so uncommonly low vis-a-vis the current state of the art of synthesis of solid solutions such that the products formed naturally have specific surfaces which are sufficiently high to be suitable for applications in catalysis. The calcination stage permits formation of the solid solution phases, developing the crystallinity of said solid solutions and/or adjusting their specific surface to a final value desired for a given application. The phases thus formed are clearly determined by means of X-ray diffractometric analyses. Additionally, consistent herewith, it is possible to easily adjust and control the size of the final powders obtained, simply by acting on the size of the initial sols.

In the description which follows "specific surface" comprehends the B.E.T. specific surface determined by nitrogen adsorption in accordance with ASTM standard D 3663-78 established from the Brunauer-Emmett-Teller method and described in the periodical *The Journal of the American Chemical Society*, 60, 309 (1938).

Moreover, the expression "mixed oxide based on zirconium and cerium" comprehends a composition (and its preparation) which can additionally contain a doping (stabilizing) element as defined below, in solid solution in the zirconium and/or cerium oxide.

Additionally, the expressions "cerium sols" and "zirconium sols" comprehend any system of finely divided solid particles of colloidal sizes based on cerium or zirconium oxide and/or hydrated oxide (hydroxide), in suspension in an aqueous liquid phase, it optionally being possible for said species to additionally contain residual amounts of bonded or adsorbed ions such as, for example, nitrates, acetates or ammoniums. It too will be appreciated that, in such sols, the cerium or zirconium is present either entirely in the form of colloids, or simultaneously in the ionic state and in the colloid form. However, the proportion represented by the ionic state does not exceed approximately 10% of the total of such species in the sol. According to the invention, sols are preferably employed in which the cerium and the zirconium are completely in the colloidal form.

Finally, it should be appreciated that the "mean diameter of the colloids" constituting the starting sols comprehends the mean hydrodynamic diameter of the latter, as determined by quasi-elastic light diffusion according to the method described by Michael L. McConnell in *Analytical Chemistry*, 53, No. 8, 1007 A (1981). For reasons solely of simplicity and for clarity, by the expression "mean sol size" is intended the mean hydrodynamic diameter of the colloids constituting a given sol.

The process for the synthesis for the compositions according to the invention will now be more fully described.

As indicated above, the first stage of the process of the invention entails preparing a mixture of a zirconium sol and a cerium sol.

The starting zirconium sols and cerium sols according to the invention, and the various processes for the synthesis thereof, are per se well known to this art and are described in the literature. Moreover, certain of these sols are commercially available.

Thus, for example, the zirconium sols can be prepared by hydrolysis, while hot, of a zirconyl chloride or nitrate solution at a temperature ranging from 140° C. to 300° C., and preferably from 150° C. to 200° C., the concentration of the zirconyl chloride or nitrate solution preferably ranging from 0.1 to 2 mol/l, expressed as $ZrO_2$.

It is also possible to prepare zirconium sols by hydrolysis, while hot, of a sulfuric zirconium solution, in nitric medium or in hydrochloric medium at a temperature ranging from 80° to 150° C. and preferably at about 90° C., the $SO_3/ZrO_2$ molar ratio of the sulfuric zirconium solution preferably ranging from 0.34 to 1 and its concentration preferably ranging from 0.1 to 2 mol/l expressed as $ZrO_2$. The basic zirconium sulfate thus obtained is then neutralized with a base, preferably aqueous ammonium, until a pH of approximately 8 is attained. The gel obtained is then washed and dispersed by addition of a nitric acid solution, the pH of the dispersion medium then preferably ranging from 0.5 to 5.

According to the present invention, it is possible to use zirconium sols having a mean size of from 5 nm to 500 nm, and advantageously ranging from 10 to 200 nm.

The cerium sols used per the present invention can likewise be obtained by any suitable technique, in particular, but not limited to, the techniques described in FR-A-2,583,735, FR-A-2,583,736, FR-A-2,583,737, FR-A-2,596,380, FR-A-2,596,382, FR-A-2,621,576 and FR-A-2,655,972, each of which assigned to the assignee hereof and hereby expressly incorporated by reference.

According to the present invention, cerium sols can be used in which the mean size thereof can range from 3 nm to 100 nm, preferably from 5 to 50 nm.

It will be appreciated that the initial pHs, the concentrations and the order of introduction of the starting sols are selected and adjusted such that the resulting colloidal mixture has a stable and homogeneous nature. To this end, more or less vigorous stirring may be necessary. Additionally, the amounts of cerium and zirconium used and present in the resulting mixture must correspond conventionally and simply to the stoichiometric proportions required for providing the final desired composition. The compositions thus obtained will be more fully described below.

In an essential embodiment of the process according to the invention, the ratio of the mean size of the zirconium sol to the mean size of the cerium sol (it being understood that these two mean sizes are expressed in the same unit of measurement, for example in nanometers) must be greater than or equal to approximately 5. Preferably, said ratio is greater than or equal to approximately 10, and still more preferably from at least approximately 20. It has been determined that the products obtained utilizing ratios less than approximately 5 have particularly poor specific surfaces and, in all instances, markedly insufficient specific surfaces to be suitable for applications in the field of catalysis.

In a preferred embodiment of the invention, it is additionally possible to introduce, into the above mixture, a third element (or doping element) selected from among the elements per se known for stabilizing the specific surfaces of zirconium oxides $ZrO_2$ and/or ceric oxides $CeO_2$, when these oxides are provided alone and uncombined. It was thus determined that the known agents for stabilizing the specific surfaces of zirconium oxides (zirconias) and/or ceric oxides, utilized alone as indicated above, unexpectedly and surprisingly provide for substantially and significantly improving the specific surface of the compositions of mixed oxide type per the present invention.

Exemplary stabilizing agents which can be used alone or in admixture according to the present invention include the elements selected from among the rare earth metals, and in particular yttrium, lanthanum, praseodymium and neodymium; the alkaline-earth metals, in particular magnesium, calcium and barium; aluminum; silicon; thorium; scandium; gallium; boron; titanium; vanadium; niobium; tantalum; chromium or bismuth. Among these, the three stabilizing agents, lanthanum, aluminum and silicon, are particularly preferred.

The stabilizing agent is typically introduced into the mixture in the form of one of its soluble salts. Introduction in the form of a sol is also within the ambit of the invention, when indeed the latter exists. The amount of stabilizing agent to be used is then generally such that the content of stabilizing element, expressed in the oxide form thereof, in the final composition, ranges from 0.1% to 20% by weight with respect to the total weight of the composition.

The initial mixture thus obtained, the addition of a base thereto is then carried out, in accordance with the second stage of the process of the invention. This addition is carried out until the species have completely precipitated.

The basic solution is, especially, an aqueous ammonia, sodium hydroxide or potassium hydroxide solution. It is also possible to use gaseous ammonia. According to the invention, an aqueous ammonia solution is the preferred. It will be appreciated that the base can also be introduced directly into the initial mixture in a solid form, when the latter exists and/or when it is readily soluble in aqueous medium.

The normality of the basic solution is not critical according to the invention and it can thus vary over wide limits, for example from 0.1 to 11N, but it is nonetheless preferred to use solutions whose concentrations range from 1 to 5N.

In actual practice, the amount of base to be added is determined such that the final pH of the mixture at the end of precipitation is greater than 4, an preferably greater than or equal to 7.

The addition can be carried out in a single step, gradually or continuously, and it is preferably carried out with stirring. This operation can be carried out at a temperature ranging from room temperature (18°–25° C.) to the reflux temperature of the reaction mixture, it being possible for the latter to attain a value of 120° C., for example. It is preferably carried out at room temperature.

At the end of the addition of the basic solution, it is optional to maintain the reaction mixture under stirring for a short period of time, to complete the precipitation.

At the conclusion of the precipitation stage, a mass of a solid precipitate is recovered which can be separated from its mixture by any conventional solid/liquid separation technique such as, for example, filtration, settling, straining or centrifuging. Taking account of its simplicity, a filtration operation is preferred.

The product thus recovered can then be washed, each such washing then being carried out with water or with an aqueous ammonia solution, but preferably with water. It will be appreciated that the use of organic solvents, such as, for example, alcohols, ketones, hydrocarbons, etc., for conducting the washing, is also within the ambit of the invention.

To remove the residual water, the washed product can lastly, optionally, be dried, for example in air, at a temperature which can range from 80° to 300° C., preferably from 100° C. to 150° C., drying being continued until a constant weight is attained.

It will also be appreciated that it too is possible to dry the product via a conventional spraying (spray drying), either of the suspension as resulting directly from the precipitation stage, or of a suspension as obtained by resuspending the separated and then optionally washed, as indicated above, precipitate in water.

In a last stage of the process of the invention, the recovered precipitate, after optional washing and/or drying, must then be calcined. Such calcination is carried out until complete formation of the desired mixed oxide(s) is attained. It also permits developing and/or perfecting the crystallinity of the solid solution phases formed, and it can lastly be adjusted according to the temperature of subsequent intended use for the composition according to the invention, taking account of the fact that the specific surface of the product is decreased as the calcination temperature is increased. The advantage of carrying out a calcination of the composition at a temperature greater than the temperature which is strictly necessary to obtain its formation and, more precisely, at least equal to its temperature of intended use, is that the stabilization of the characteristics of the final product is thus promoted. Notably, such operation is directed at limiting the risks related to a possible subsequent change in the product (especially in its specific surface) when the latter is placed under thermal conditions of use which are more severe than the calcination temperature to which it has been subjected during its preparation.

The calcination stage is typically carried out in air, but a calcination carried out, for example, under an inert gas is obviously also intended.

As described above, it is possible, by virtue of the process according to the invention, to produce solid solutions by using very low temperatures of synthesis, on the order of 700° C., the resulting solid solutions then having the highest specific surfaces. It is apparent that the exact temperatures at which the solid solutions will be formed depend largely on the compositions thereof, in particular on the relative zirconium and cerium contents and on the presence or absence of a doping element, such that a general rule is not possible.

However, in practice, the final calcination stage can be suitably carried out at calcination temperatures generally ranging from 700° C. to 1,000° C., preferably from 800° C. to 1,000° C.

Even after calcinations at high temperatures, i.e., in particular temperatures greater than those which are strictly necessary to form and/or to clearly reveal, by X-ray analysis, the desired solid solutions, the compositions according to the invention retain wholly acceptable specific surfaces.

The particular compositions according to the present invention will now be more fully described.

These compositions are primarily characterized by their high specific surface areas, namely, greater than 10 $m^2/g$.

Advantageously, the compositions according to the invention have a specific surface of at least 20 $m^2/g$, more preferably of at least 30 $m^2/g$ and still more preferably of at least 40 $m^2/g$. In certain instances, the compositions of the present invention can even have specific surfaces of at least 50 $m^2/g$.

Moreover, in another embodiment of the invention, when the subject compositions are calcined at relatively high temperatures, as can be the case, for example, upon their use in the field of catalysis, especially in exhaust gas catalytic converters and mufflers, they continue to have entirely suitable specific surfaces. Thus, heated to 800° C., the compositions according to the invention retain a specific surface which is still at least 20 $m^2/g$, preferably at least 30 $m^2/g$, and still more preferably at least 40 $m^2/g$. When these compositions are heated to 900° C., the specific surfaces are still retained at values of at least 20 $m^2/g$, preferably of at least 30 $m^2/g$ and still more preferably of at least 40 $m^2/g$.

Stated differently, the compositions according to the present invention have a very good thermal stability with respect to their specific surfaces.

The presence of the elements cerium and zirconium (and optionally of the doping element) in the compositions of the invention can be determined by simple chemical analyses, while conventional X-ray diffraction analyses indicate the precise form thereof.

Thus, as described above, the aforesaid elements are present in the compositions according to the invention in a combined form of essentially, and preferably entirely, solid solution or mixed oxide type. The X-ray diffraction spectra of these compositions, in particular, show the existence of a clearly identifiable predominant phase which corresponds to that of a zirconium oxide crystallized in the cubic or quadratic habit and whose unit cell parameters are more or less displaced with respect to a pure zirconia, thus reflecting the incorporation of cerium (optionally of the doping element) in the crystal lattice of the zirconium oxide, and, hence, the existence of a true solid solution. At high cerium contents, it is possible to observe the presence of certain amounts (minor fractions) of a ceric oxide either uncombined or containing $ZrO_2$ in solid solution, but in both cases completely embedded in the matrix of the composition.

Expressed in the form of the oxides thereof, the compositions according to the invention characteristically contain, overall, from 1% to 49% by weight of cerium and from 99% to 51% by weight of zirconium. Preferably, the amount of cerium ranges from 1% to 30% by weight and the amount of zirconium from 99% to 70% by weight. When the subject compositions additionally contain a doping agent, or dopant, as indicated above, the amount of such element, also expressed as the oxide thereof, advantageously ranges from 0.1% to 20% by weight, and preferably from 1% to 10% by weight, with respect to the total weight of the composition.

It will thus be seen that the solid solutions having high specific surfaces in accordance with the invention can vary over a very wide compositional range, while nevertheless remaining principally based on zirconium. The cerium upper content limit in the composition is, indeed, dictated only by the solubility limit of this species in zirconium oxide.

Accordingly, the remarkably high specific surfaces of the novel compositions of the invention permit very many applications thereof. They are particularly well suited for use in the field of catalysis, whether as catalysts and/or as catalyst supports. They can be employed as catalysts or catalyst supports for carrying out a variety of reactions such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases emanating from internal combustion engines, demetallation, methanation or shift conversion.

However, one of the most important applications of the compositions according to the invention, as described above, is the use of same as constituents of catalysts for the treatment of exhaust gases emanating from internal combustion engines. More particularly still, the compositions according to the invention are especially well suited for the production of catalysts for the treatment of exhaust gases from diesel engines. Thus, in this application, the compositions of the invention are, before or after their impregnation by catalytically active elements, such as precious metals, shaped to form catalysts, for example in the form of beads, or used to form a coating of a refractory body such as a metallic or ceramic monolith, such coating being well known in this art under the designation "washcoat."

In order to further illustrate the present invention and the advantages thereof, the following specific examples are given, it being understood that same are intended only as illustrative and in nowise limitative.

EXAMPLE 1

7,500 g of a cerium sol (prepared as described in FR-A-2,583,736), containing 180 g of $CeO_2$ and having a mean colloid size of approximately 5 nm, on the one hand, were mixed with 2,100 g of a zirconium sol containing 20% by weight of $ZrO_2$ and having a mean colloid size of 100 nm, on the other, (r=20) such as to provide a final mixed oxide of the following composition by weight:

70% $ZrO_2$/30% $CeO_2$.

450 g of a 2M aqueous ammonia solution were introduced, with vigorous stirring, into the mixture thus obtained. The final pH of the mixture of precipitation was then approximately 7.5. The precipitate thus formed was recovered by filtration, then washed with water and lastly dried at 120° C. for 16 hours in an oven.

After calcinations in air at various temperatures, the BET specific surfaces of the products obtained were the following:

(a) 6 hours at 600° C.: 76 m²/g (b) 3 hours at 800° C.: 34 m²/g (c) 6 hours at 900° C.: 25 m²/g The presence of the following solid solutions was determined in the product calcined at 900° C. by X-ray diffraction spectrum analysis:

(i) a first solid solution phase of $CeO_2$ (approximately 5% by weight) in $ZrO_2$; the mean size of the crystallites in this solid solution was on the order of 10 nm;

(ii) a second solid solution phase of $ZrO_2$ (approximately 40% by weight) in $CeO_2$; the size of the crystallites was on the order of 9 nm.

Moreover, the Oxygen Storage Capacity (OSC) of the product obtained after calcination at 1,000° C. was measured according to the test given below. The value determined was 3.8 ml CO/g $CeO_2$.

Test for determining the oxygen storage capacities

A mass of 0.3 g of the product calcined at 1,000° C. was subjected to a gas flow consisting of helium at 2 bar and at a flow rate of 10 l/h.

Either carbon monoxide (CO), at a concentration of 5%, or oxygen, at a concentration of 2.5%, was pulse injected into this carrier gas.

The test was carried out according to the following sequence:

(1) increase in temperature to 400° C. under helium, (2) introducing a series of oxygen pulses, (3) introducing a series of CO pulses, (4) introducing a new series of $O_2$ pulses, (5) introducing alternating CO and $O_2$ pulses.

In order to determine and assess the storage capacity, the mean CO consumption (in ml) attained per gram of $CeO_2$ during the last series of alternating CO and $O_2$ pulses was then measured.

It will be appreciated that, to express the oxygen storage capacity in ml $O_2$/g $CeO_2$, it was then sufficient to divide by 2 the preceding value expressed in ml CO/g $CeO_2$.

EXAMPLE 2

The procedure of Example 1 was repeated, except for the difference that a zirconium sol was used which had a mean colloid size of approximately 50 nm (r=10).

The characteristics of the product obtained after calcination for 6 hours at 900° C. were the following:

(a) BET specific surface: 20 m²/g, (b) phases detected via X-ray diffraction:

(i) a first solid solution of $CeO_2$ (approximately 25% by weight) in $ZrO_2$; the mean size of the crystallites constituting this solid solution was approximately 11 nm, (ii) a second solid solution of $ZrO_2$ in $CeO_2$, of crystallites having a mean size of approximately 6.5 nm.

The oxygen storage capacity measured on the product calcined at 1,000° C. was 2.8 ml CO/g $CeO_2$.

EXAMPLE 3

The procedure of Example 1 was repeated, except for the difference that a cerium sol was used which had a mean colloid size on the order of 15 nm (r=6.5).

The BET specific surface of the product obtained after calcination for 6 hours at 900° C. was 22 $m^2/g$.

EXAMPLE 4

This example illustrates incorporating a doping agent in the compositions of the invention in this case aluminum.

The procedure of Example 1 was repeated, except for the difference that a boehmite sol was also added to the mixture as a doping agent, such as to provide a composition in accordance with the invention doped with 15% by weight of alumina $Al_2O_3$.

The BET specific surface of the product obtained after calcination for 6 hours at 900° C. was 39 $m^2/g$.

EXAMPLE 5 (COMPARATIVE)

The procedure of Example 1 was repeated, except for the difference that a zirconium sol was used which had a mean colloid size of approximately 10 nm (r=2).

The BET specific surface of the product obtained after calcination for 6 hours at 900° C. was only 10 $m^2/g$.

The oxygen storage capacity of the product calcined at 1,000° C. was only 1.6 ml CO/g $CeO_2$.

EXAMPLE 6 (COMPARATIVE)

The procedure of Example 1 was repeated, except for the differences that a zirconium sol having a mean colloid diameter of approximately 50 nm and a cerium sol having a mean colloid diameter on the order of 15 nm (r=3.5) were used.

The BET specific surface of the product obtained after calcination for 6 hours at 900° C. was 18 $m^2/g$.

EXAMPLE 7 (COMPARATIVE)

Precipitation was carried out at various pHs, by addition of ammonium hydrogencarbonate, of a mixed solution containing, on the one hand, zirconium nitrate and, on the other, cerium nitrate (soluble salts) in a ratio of concentrations which provided, in the final composition (after calcination), the following ratio by weight as oxides: 80% as $ZrO_2$ and 20% as $CeO_2$.

The precipitate was recovered by filtration, then washed and lastly dried.

After calcination for 6 hours at 900° C. under air, a BET specific surface of 10 $m^2/g$ was obtained for the two products which were produced, respectively, via a precipitation at a pH of 4 and via a precipitation at a pH of 8.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A zirconium/cerium mixed oxide having a specific surface area of greater than 10 $m^2/g$.
2. The zirconium/cerium mixed oxide as defined by claim 1, having a specific surface area of at least 20 $m^2/g$.
3. The zirconium/cerium mixed oxide as defined by claim 2, having a specific surface area of at least 30 $m^2/g$.
4. The zirconium/cerium mixed oxide as defined by claim 3, having a specific surface area of at least 40 $m^2/g$.
5. The zirconium/cerium mixed oxide as defined by claim 4, having a specific surface area of at least 50 $m^2/g$.
6. The zirconium/cerium mixed oxide as defined by claim 1, having, after heat treatment at 800° C., a specific surface area of at least 20 $m^2/g$.
7. The zirconium/cerium mixed oxide as defined by claim 6, having, after heat treatment at 800° C., a specific surface area of at least 30 $m^2/g$.
8. The zirconium/cerium mixed oxide as defined by claim 7, having, after heat treatment at 800° C., a specific surface area of at least 40 $m^2/g$.
9. The zirconium/cerium mixed oxide as defined by claim 1, having, after heat treatment at 900° C. a specific surface area of at least 20 $m^2/g$.
10. The zirconium/cerium mixed oxide as defined by claim 9, having, after heat treatment at 900° C., a specific surface area of at least 30 $m^2/g$.
11. The zirconium/cerium mixed oxide as defined by claim 10, having, after heat treatment at 900° C., a specific surface area of at least 40 $m^2/g$.
12. The zirconium/cerium mixed oxide as defined by claim 1, comprising finely divided solid particulates thereof.
13. The zirconium/cerium mixed oxide as defined by claim 12, comprising a solid solution thereof.
14. The zirconium/cerium mixed oxide as defined by claim 13, comprising from 1% to 49% by weight of cerium values.
15. The zirconium/cerium mixed oxide as defined by claim 14, comprising from 1% to 30% by weight of cerium values.
16. The zirconium/cerium mixed oxide as defined by claim 14, comprising from 99% to 51% by weight of zirconium values.
17. The zirconium/cerium mixed oxide as defined by claim 16, comprising from 99% to 70% by weight of zirconium values.
18. A zirconium-based, zirconium/cerium mixed oxide as defined by claim 1.
19. A zirconium/cerium mixed oxide as defined by claim 1, further comprising a stabilizing amount of a dopant therefor.
20. The zirconium/cerium mixed oxide as defined by claim 19, wherein said dopant is a rare earth, an alkaline-earth metal, aluminum, thorium, scandium, gallium, boron, titanium, vanadium, niobium, tantalum, chromium and/or bismuth.
21. The zirconium/cerium mixed oxide as defined by claim 1, comprising zirconium oxide crystallized in the cubic or quadratic habit.
22. The zirconium/cerium mixed oxide as defined by claim 1, comprising a first solid solution phase of $CeO_2$ in $ZrO_2$ and a second solid solution phase of $ZrO_2$ in $CeO_2$.
23. The zirconium/cerium mixed oxide as defined by claim 1, the cerium values thereof being incorporated in a crystal lattice of zirconium oxide.
24. A process for the preparation of the zirconium/cerium mixed oxide as defined by claim 1, comprising (i) intimately admixing a zirconium sol with a cerium sol, the ratio r of the mean diameter $r_1$ of the particles of said zirconium sol to the mean diameter $r_2$ of the particles of said cerium sol being at least 5, (ii) adding a precipitating amount of a base thereto, (iii) recovering the precipitate thus formed, and (iv) calcining said precipitate.

25. The process as defined by claim 24, the mean diameter of the particles of said zirconium sol ranging from 5 nm to 500 nm.

26. The process as defined by claim 25, said mean diameter ranging from 10 nm to 200 nm.

27. The process as defined by claim 25, the mean diameter of the particles of said cerium sol ranging from 3 nm to 100 nm.

28. The process as defined by claim 26, the mean diameter of the particles of said cerium sol ranging from 5 nm to 50 nm.

29. The process as defined by claim 24, said ratio r being at least 10.

30. The process as defined by claim 29, said ratio r being at least 20.

31. The process as defined by claim 24, further comprising intimately admixing a stabilizing amount of a dopant with said zirconium sol and said cerium sol.

32. The process as defined by claim 31, said dopant comprising lanthanum, aluminum, silicon, or mixture thereof.

33. The process as defined by claim 24, said base comprising aqueous ammonia, sodium hydroxide, or potassium hydroxide.

34. The process as defined by claim 24, comprising adding such amount of base as to adjust the pH of the admixture of precipitation to a value of at least 4.

35. The process as defined by claim 34, comprising adjusting the pH of the admixture of precipitation to a value of at least 7.

36. The process as defined by claim 24, comprising recovering said precipitate by filtration.

37. The process as defined by claim 24, comprising washing said precipitate upstream of said calcination.

38. The process as defined by claim 24, comprising calcining said precipitate at a temperature ranging from 700° to 1,000° C.

39. The process as defined by claim 38, comprising calcining said precipitate at a temperature ranging from 800° to 1,000° C.

40. A catalyst/catalyst support comprising the zirconium/cerium mixed oxide as defined by claim 1.

41. The catalyst/catalyst support as defined by claim 40, further comprising aluminum values.

42. The catalyst/catalyst support as defined by claim 40, comprising a monolith.

43. A catalyst as defined by claim 40, said zirconium/cerium mixed oxide comprising a washcoat thereof.

44. A zirconium/cerium mixed oxide comprising a first solid solution phase of $CeO_2$ in $ZrO_2$ and a second solid solution phase of $ZrO_2$ in $CeO_2$, wherein said zirconium/cerium mixed oxide is more than 10% by weight of cerium value and has, after heat treatment at 900° C., a specific surface area of at least 20 $m^2/g$.

45. The zirconium/cerium mixed oxide of claim 44, wherein the first solid solution phase of $ZrO_2$ in $CeO_2$ is present in a predominant weight compared to the second phase.

46. The zirconium cerium mixed oxide of claim 44, wherein the zirconium/cerium mixed oxide is at least 20% by weight of cerium values.

47. The zirconium cerium mixed oxide of claim 44, wherein the zirconium/cerium mixed oxide is at least 30% by weight of cerium values.

48. The zirconium cerium mixed oxide of claim 44, wherein the zirconium/cerium mixed oxide is between 30% and 49% by weight of cerium values.

49. A process for the preparation of a zirconium/cerium mixed oxide having after heat treatment at 800° C. a specific surface area of at least 20 $m^2/g$, comprising (i) intimately admixing a zirconium sol with a cerium sol, the ratio r of the mean diameter $r_1$ of the particles of said zirconium sold to the mean diameter $r_2$ of the particles of said cerium sol being at least 5, (ii) adding a precipitating amount of a base thereto, (iii) recovering the precipitate thus formed, and (iv) calcining said precipitate.

* * * * *